United States Patent
Sooy et al.

(10) Patent No.: US 9,219,886 B2
(45) Date of Patent: Dec. 22, 2015

(54) METHOD AND APPARATUS FOR ANALYZING IMAGE DATA GENERATED DURING UNDERGROUND BORING OR INSPECTION ACTIVITIES

(71) Applicant: Emerson Electric Co., St. Louis, MO (US)

(72) Inventors: Josh Sooy, North Ridgeville, OH (US); Justin Daw, North Ridgeville, OH (US); Paul Fresty, Rocky River, OH (US); Lucian-Vasile Muresan, Cluj-Napoca (RO); Brad Yuronich, Elyria, OH (US)

(73) Assignee: Emerson Electric Co., St. Louis, MO (US)

(*) Notice: Subject to any disclaimer, the term of this patent is extended or adjusted under 35 U.S.C. 154(b) by 329 days.

(21) Appl. No.: 13/801,330

(22) Filed: Mar. 13, 2013

(65) Prior Publication Data
US 2014/0168408 A1    Jun. 19, 2014

Related U.S. Application Data

(60) Provisional application No. 61/738,103, filed on Dec. 17, 2012.

(51) Int. Cl.
*H04N 7/18* (2006.01)
*E21B 47/00* (2012.01)
(Continued)

(52) U.S. Cl.
CPC .............. *H04N 7/18* (2013.01); *E21B 47/0002* (2013.01); *G06T 7/0004* (2013.01)

(58) Field of Classification Search
CPC .......... H04N 5/33; H04N 7/18; G06T 7/0002; G06K 9/00; G01B 11/25; G01B 11/03; G01B 11/00; G01C 25/00; G01D 5/38

USPC ..................................... 348/79, 85
See application file for complete search history.

(56) References Cited

U.S. PATENT DOCUMENTS 4,974,168 A    11/1990    Marx
5,331,550 A    7/1994    Stafford et al.
(Continued)

FOREIGN PATENT DOCUMENTS

DE    4328031    9/1992
EP    0654631    11/1994
(Continued)

OTHER PUBLICATIONS

Minnesota Department of Public Safety, "Alert Notice to Underground Gas Pipeline Operators," May 10, 2010, 3 pages.
(Continued)

*Primary Examiner* — Richard Torrente
*Assistant Examiner* — Marnie Matt

(57) ABSTRACT

A system includes a visual inspection system and an image analysis system. The visual inspection system includes an inspection camera that captures images from within an interior of at least one of a utility line and a tunnel for installing a utility line, and a first communication interface that communicates image data corresponding to the images. The image analysis system includes a second communication interface that receives the image data from the visual inspection system, a model adaptation module that modifies a classifier model based on at least one of feedback data and training data, and a classifier module that implements the classifier model to identify a plurality of features in the image data corresponding to defects and that modifies the image data according to the identified plurality of features. The defects include at least one of a cross-bore, a lateral pipe, and an imperfection.

24 Claims, 3 Drawing Sheets

(51) Int. Cl.
*G06T 7/00* (2006.01)
*G06K 9/00* (2006.01)
*G01B 11/00* (2006.01)
*G01B 11/03* (2006.01)

(56) References Cited

U.S. PATENT DOCUMENTS

| | | |
|---|---|---|
| 5,454,276 A | 10/1995 | Wernicke |
| 5,742,517 A | 4/1998 | Van Den Bosch |
| 5,892,163 A | 4/1999 | Johnson |
| 6,175,380 B1 | 1/2001 | Van Den Bosch |
| 6,239,593 B1 | 5/2001 | Burkhardt et al. |
| 6,650,779 B2 | 11/2003 | Vachtesvanos et al. |
| 7,131,344 B2 | 11/2006 | Tarumi |
| 7,215,811 B2 | 5/2007 | Moselhi et al. |
| 2003/0023404 A1 | 1/2003 | Moselhi et al. |
| 2003/0118230 A1 | 6/2003 | Song et al. |
| 2006/0266134 A1 | 11/2006 | MacMillan et al. |
| 2008/0210024 A1 | 9/2008 | Merlo |
| 2011/0196534 A1 | 8/2011 | Ekes et al. |
| 2011/0261649 A1 | 10/2011 | Wallbom et al. |

FOREIGN PATENT DOCUMENTS

| | | |
|---|---|---|
| EP | 2192538 A2 | 6/2010 |
| WO | WO-2013012981 A1 | 1/2013 |

OTHER PUBLICATIONS

European Search Report corresponding to European Patent Application No. 13195562.7, dated Apr. 25, 2014, 8 pages.
Sinha, Sunhil K. Automated Underground Pipe Inspection Using a Unified Image Processing and Artificial Intelligence Methodology. Thesis. University of Waterloo, 2000. Waterloo, Ontario, Canada: Civil Engineering and Systems Design Engineering, 2000. 198 pages.
Newman, Timothy S., and Anil K. Jain. "A Survey of Automated Visual Inspection." Computer Vision and Image Understanding March vol. 61. No. 2 (1995): pp. 231-262. Web. Dec. 20, 1993.
US 5,870,314, 02/1999, Van Den Bosch (withdrawn)

METHOD AND APPARATUS FOR ANALYZING IMAGE DATA GENERATED DURING UNDERGROUND BORING OR INSPECTION ACTIVITIES

CROSS-REFERENCE TO RELATED APPLICATIONS

This application claims the benefit of U.S. Provisional Application No. 61/738,103, filed on Dec. 17, 2012. The entire disclosure of the application referenced above is/are incorporated herein by reference.

FIELD

The present disclosure relates generally to the field of underground utility construction and, more particularly, to an inspection system and method for analyzing image data in underground boring operations.

BACKGROUND

This section provides background information related to the present disclosure which is not necessarily prior art.

Underground utility lines are sometimes installed using any of a variety of trenchless installation technologies, including horizontal boring technologies. Horizontal boring technologies provide efficient and cost effective ways to install gas, water, electric and communications lines, particularly when it is difficult or cost prohibitive to plow or trench the ground, such as when there are ground obstructions (e.g., a road, sidewalk, driveway, or landscaping) along the path of the utility line that prevent those techniques. Some horizontal boring technologies include underground pneumatic boring, auger boring, wet boring, horizontal directional drilling (HDD), impact moling, pipe jacking and microtunneling.

The process of underground pneumatic boring involves launching a pneumatic boring or piercing tool that creates a horizontal bore hole along a straight path to create a tunnel through the ground. A utility line (e.g., for gas, water, electric or communications) can then be pulled back through the tunnel for installation underground. For example, existing utility lines and surface obstacles to be traversed by the utility line are surveyed and a path for the new utility line is chosen. Two pits are excavated on opposite sides of the obstacle, including one pit at an origin of the path (the entrance pit) and one pit at a target destination of the path (the exit pit). The pits are large enough to fit the boring tool and to permit an operator to work. The pits are also deep enough so that as the boring tool creates the tunnel, the surface of the ground above the tunnel remains undisturbed.

The boring tool comprises a pneumatically-operated boring tool that cuts through soil, rock, etc. The boring tool is connected to a supply of compressed air by a hose. A guide tool and a sighting device are used to align the boring tool along the desired path and toward the intended destination. The boring tool is then activated to cut an underground bore, advancing through the wall of the entrance pit with the air supply hose following behind the boring tool. Once the boring tool has progressed beyond the guide tool, the location of the boring tool is tracked through the ground with a radio frequency receiver that detects a radio signal generated by a radio transmitter built into the boring tool.

When the boring tool reaches the target destination, a tunnel is created between the entrance pit and the exit pit and beneath the surface obstacle. The boring tool is removed from the air supply hose and the utility line is attached to the air supply hose (e.g., by taping the utility line to the hose). The hose and the utility line are pulled back through the tunnel together, thereby installing the utility line underground.

Underground pneumatic boring, however, has drawbacks which can result in difficulties in completing a bore for an underground utility line. For example, the boring tool is not steerable, and once the boring tool has exited the guide tool the operator no longer has control over the trajectory of the boring tool. Consequently, the boring tool can be deflected from the desired path by rocks and different soil densities, for example. Even minor deflections can cause significant deviations from the desired path over long distances. Consequently, the boring tool could unintentionally cross the path of other already existing underground utilities. Therefore, and notwithstanding the fact that existing underground utility lines are located and marked from above ground before the pneumatic boring underground is carried out, it is possible that the boring tool can tunnel through an existing utility line, such as a sanitary sewer line. Consequently, the newly installed utility line may be run through the existing sewer line. In such an instance, a crossbore—that is, an intersection of two or more underground utilities—is created.

A significant concern for the underground utility construction industry, regardless of the horizontal boring process employed, is unknowingly tunneling through a sewer line and thereafter running a utility line, such as a natural gas pipeline or power line, through the sewer line. The crossbored utility line may remain in place for months or years before a blockage develops in the sewer line. Then, in the process of clearing the sewer line, the utility line can be severed, ruptured, or otherwise damaged by a power drain auger or other tool or machine that is used to clear the sewer line.

SUMMARY OF THE INVENTION

A system includes a visual inspection system and an image analysis system. The visual inspection system includes an inspection camera that captures images from within an interior of at least one of a utility line and a tunnel for installing a utility line, and a first communication interface that communicates image data corresponding to the images. The image analysis system includes a second communication interface that receives the image data from the visual inspection system, a model adaptation module that modifies a classifier model based on at least one of feedback data and training data, and a classifier module that implements the classifier model to identify a plurality of features in the image data corresponding to defects and that modifies the image data according to the identified plurality of features. The defects include at least one of a cross-bore, a lateral pipe, and an imperfection.

A method includes capturing images from within an interior of at least one of a utility line and a tunnel for installing a utility line. The method further includes, using an image analysis system, receiving the image data corresponding to the images, modifying a classifier model based on at least one of feedback data and training data, using the classifier model to identify a plurality of features in the image data corresponding to defects, wherein the defects include at least one of a cross-bore, a lateral pipe, and an imperfection, and modifying the image data according to the identified plurality of features.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
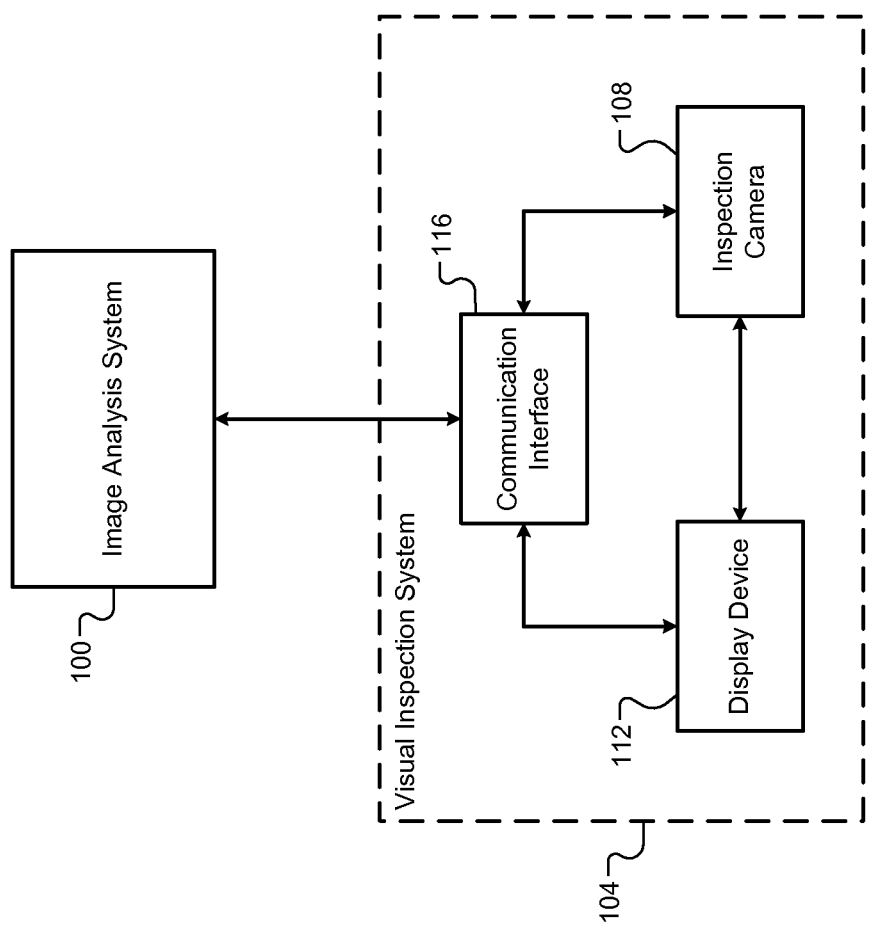
FIG. 1 is a functional block diagram of a system including a visual inspection system and an image analysis system according to the principles of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. Example embodiments will now be described more fully with reference to the accompanying drawings.

An image analysis system for use with an inspection system is broadly applicable for use in the underground utility construction industry, and particularly in underground boring operations used for installing underground utility lines. For example, the inspection system generally includes a sensor, a sensor carrier, and an output device. The sensor is employed to obtain inspection data regarding the condition of the tunnel created by the underground boring operation. Any of a variety of different sensor technologies could be employed in the inspection system, such as a camera that captures visible images of the tunnel, as well as passive sensors like touch sensors that can physically sense features of the tunnel, infrared sensors that can capture infrared images of the tunnel, or vapor sensors that can sense the presence of Volatile Organic Compounds (VOCs) or other gases in the tunnel, or active sensors like sonar, radar and lasers that can measure features of the tunnel. Further, the camera can be used to capture images inside an existing utility line or pipe (e.g., a sewer pipe) during routine inspection, and/or after a utility line is installed, and can identify and document whether another utility line passes through the existing line (i.e., to detect a lateral pipe passing through an existing line).

The sensor carrier is adapted to incorporate the sensor and connect to means for transporting the sensor through the tunnel. The output device receives an output signal from the sensor corresponding to the inspection data and presents it to an operator for interpretation and/or otherwise documents and/or creates a record of the inspection. In addition, the output device can include a user interface that enables an operator to add a user input to a record of the inspection, such as notes, commentary, or the like. The user input can take any of a variety of forms, including, but not limited to, typewritten text, audio, time stamping, and/or bookmarking. Additionally, the output device can be configured to broadcast or post a record of the inspection so the record is accessible to specified recipients, including to a database of the operator, to local municipalities, to regulatory agencies, to utility companies, to other contractors, and to property owners. An example inspection system and method is described in Patent Cooperation Treaty Application No. PCT/US2012/047290, filed on Jul. 19, 2012, which is hereby incorporated herein, in its entirety.

Referring now to FIG. 1, an example image analysis system 100 according to the present disclosure and for use with an example visual inspection system 104 is shown. The visual inspection system 104 includes an inspection camera 108 that is configured for travel through a tunnel created in an underground pneumatic boring operation before a new utility line is installed, and/or to travel through an existing utility pipe after a new utility line is installed in the same area as the existing utility pipe. As the camera 108 traverses the tunnel, an operator can view a real-time image of the tunnel on a display device 112 and make a visual inspection of the tunnel to determine whether another already existing utility line, such as a sanitary sewer line, has been intersected during the boring operation. Similarly, the camera 108 may be passed through an existing utility line to determine whether the utility line passes through another existing utility line. By doing so, the potential for crossbores is significantly reduced, and/or crossbores (and laterals) may be detected and corrected.

A suitable inspection camera for use with a visual inspection system of the present disclosure is available from Ridge Tool Company of Elyria, Ohio, such as one of the SeeSnake® drain and sewer inspection camera and cable reels. The output from the camera can include still pictures and/or video. In addition, a suitable display device for viewing and/or recording the output from the camera is likewise available from Ridge Tool Company, such as the SeeSnake® monitors and recorders. Also, the lens of the camera can be varied to alter the viewing angle and/or field of view of the camera. For example, a "fish eye" lens may be incorporated so that the walls of a bore peripheral to the camera are captured within the camera's field of view. In addition, the inspection images can be recorded and/or otherwise saved to document the underground boring operation, that no crossbores were created, that no underground utilities were damaged, and/or that there were no other obstacles in the path of the tunnel.

Further, in addition to the visual inspection of the tunnel on the display device 112, image data provided by the inspection camera 108 is communicated to the image analysis system 100. For example, the inspection system 104 includes a communication interface 116. For example only, the communication interface operates according to one or more suitable wireless communication protocols including, but not limited to, wireless network (e.g., Wi-Fi), cellular, global navigation system satellite (GNSS), and/or Bluetooth protocols to provide the image data to the image analysis system 100. Although shown independent of the inspection camera 108 and the display device 112, the communication interface 116 may also be incorporated within the inspection camera 108 and/or the display device 112.

The image analysis system 100 receives the image data, which may include both image still data and video data, from the visual inspection system 104. For example only, the image analysis system 100 is remotely located from the visual inspection system 104, such as in any suitable computing and/or storage device of a cloud networking system. However, the image analysis system 100 may also be implemented in one or more components of the visual inspection system 104. Or, functions of the image analysis system 100 may be duplicated in the visual inspection system. For example, the image analysis system 100 may be implemented in the display device 112 and/or the inspection camera 108. The display device 112 may be a handheld or otherwise mobile device with a user interface for interfacing with the camera 108 and/or the image analysis system 100. Accordingly, the functions of the image analysis system 100 may be performed remotely (for example only, post processing using a server or other remote storage and/or processing apparatus accessible via cloud computing architecture) and/or on a job site (e.g., post processing and/or in real time) by a local device configured to implement the image analysis system 100.

The image analysis system 100 performs image analysis on the image data to identify portions of the image data that indicate any crossbores and/or lateral pipes. For example, the image analysis system 100 implements a model that categorizes a plurality of features indicative of crossbores and/or lateral pipes in a frame of the image data, and that assigns, for the frame of image data, a probability to each of the plurality of features that a crossbore and/or a lateral pipe is present or not present. The image analysis may also identify other types of imperfections in a utility line or carrier and/or tunnel or bore for installing the utility line or carrier. The imperfections may include, but are not limited to, inconsistencies in a tunnel surface. The inconsistencies may be caused by, for example only, a void in surrounding soil, soil and/or pipe (e.g., clay pipe) fragments in the tunnel, and or a straight surface intersecting a circular surface (e.g., a pipe or other straight object passing through a perimeter of the tunnel).

Further, the image analysis system 100 may perform the image analysis to detect crossbores, lateral pipes, imperfections, etc. regardless of whether the visual inspection system 104 is being used for this purpose. For example, the visual inspection system 104 may be used to identify and locate other features of a utility line (e.g., downspouts, drains, etc), either by direct viewing on the display device 112, or by real time or post processing using the image analysis system 100. However, while attempting to identify the other features, the image analysis system 100 may still identify crossbores, lateral pipes, imperfections, etc. in the image data.

Figure 2:
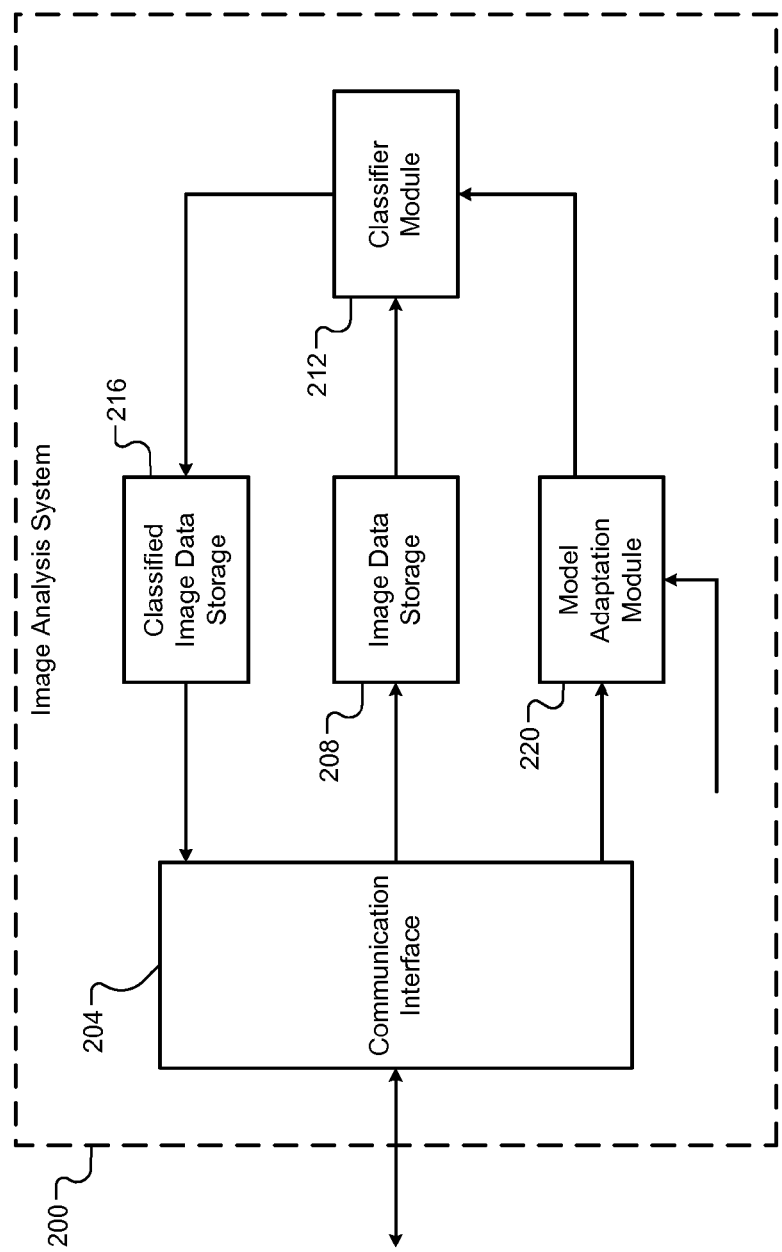
FIG. 2 is a functional block diagram of an image analysis system according to the principles of the present disclosure.

Referring now to FIG. 2, an example image analysis system 200 is shown. The image analysis system 200 communicates with the visual inspection system 104 of FIG. 1 via, for example, a communication interface 204. Or, as described above, the image analysis system 200 may be integrated with the visual inspection system 104 (e.g., integrated with the display device 112, the inspection camera 108, and/or another device of the visual inspection system 104). For example, the communication interface 204 receives image data from the visual inspection system 104. The image data is stored in image data storage 208. For example only, the image data storage 208 includes non-volatile memory that stores the image data. The image data includes video data and/or still image data.

A classifier module 212 identifies features corresponding to crossbores and/or lateral pipes in each frame of the image data and classifies each frame according to the identified features. For example, the classifier module 212 implements a classifier model that analyzes and classifies each frame according to features in the frame. For example only, each frame is assigned one or more labels including, but not limited to, "lateral pipe," "no lateral pipe," "crossbore," and/or "no crossbore." The classifier module 212 stores the classified image data in classified image data storage 216. The communication interface 204 provides the classified image data to the visual inspection system 200 or to another device or a user (e.g., upon request).

The image analysis system 200 includes a model adaptation module 220 that generates and adapts the classifier model of the classifier module 212. The model adaptation module generates and adapts the classifier model based on, for example, feedback data received via the communication interface 204 and/or training data. The feedback data includes feedback provided by an operator/user of the visual inspection system 104 regarding the classified image data. For example, the operator views the classified image data and the identified features and provides feedback indicative of the accuracy of the classified image data (e.g., whether the labels assigned to a frame of the classified image data are correct).

Conversely, the training data may include training image data (e.g., training videos) having various combinations of features (e.g., crossbore, no crossbore, lateral pipe, and/or no lateral pipe). The model adaptation module 220 extracts the features from the training image data and labels each frame accordingly (e.g., using the model), and stores classified training data. The model adaptation module 220 compares the classified training data to test data indicative of actual features of the training image data to evaluate the results of the model. The model adaptation module 220 updates the model used by the classifier module 212 according to the results.

Figure 3:
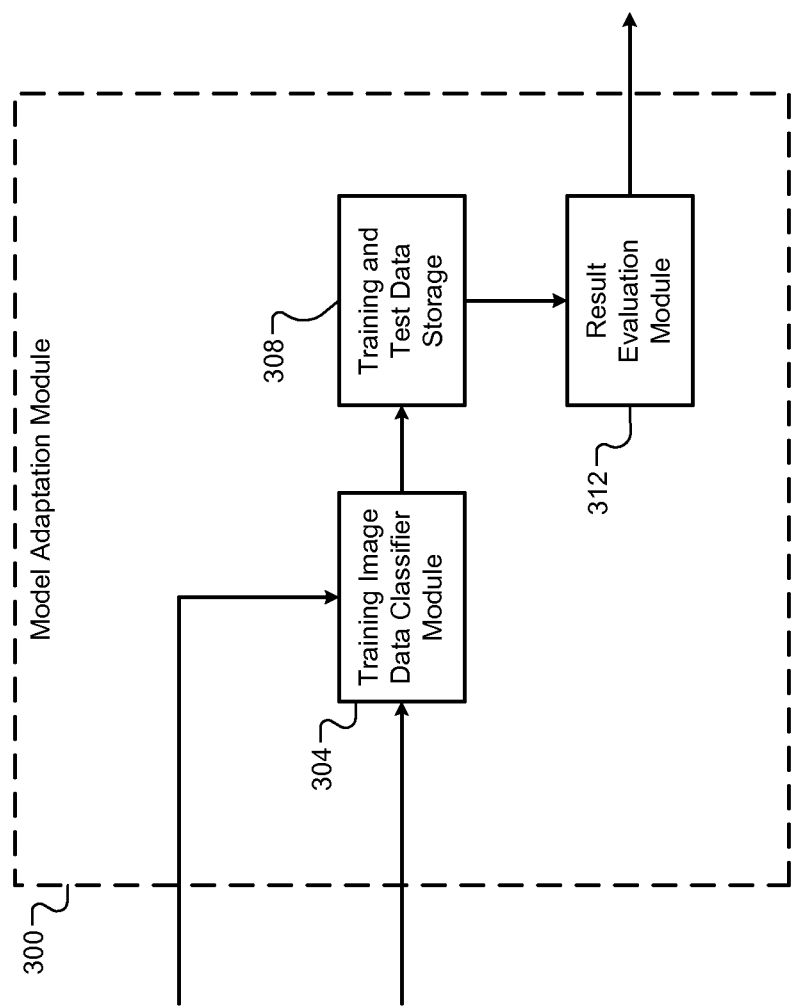
FIG. 3 is a functional block diagram of a model adaptation module according to the principles of the present disclosure.

Referring now to FIG. 3, an example model adaptation module 300 includes a training image data classifier module 304, a training and test data storage module 308, and a result evaluation module 312. The training image data classifier module receives the training image data and the feedback data, extracts features indicative of crossbores and/or lateral pipes from the training image data, and provides classified training image data to the training and test data storage module 308. For example only, the classified training image data may be separated into two sets, including a first set of training image data including features corresponding to crossbores and a second set of training image data including features corresponding to lateral pipes. The result evaluation module 312 compares the classified training image data to the test data and evaluates the performance of the model based on the comparison. An output (e.g., a model adjustment signal) of the result evaluation module 312 is indicative of the performance of the model and is provided to the classifier module 212 to adjust the model accordingly.

The training image data may include, for example, a plurality of videos arranged in different sets including different respective features. For example, the training image data may include a lateral inspection training set including a first plurality of videos with lateral pipes and a second plurality of videos with no lateral pipes. Conversely, the training image data may also include a crossbore inspection training set including a first plurality of videos with crossbores and a second plurality of videos with no crossbores.

The training image and data classifier module 304 extracts, for each of lateral pipes and crossbores, one or more features that may indicate a lateral pipe or a crossbore. The features may include, but are not limited to, parallel lines, color information, K-means clustering, and/or a discretized histogram of gradient magnitude. For example, parallel lines in a frame of image data may indicate a lateral pipe. The classifier module 304 may implement an edge detector to detect Hough lines in the image data, select one of the Hough lines L1 (e.g., a strongest one of the Hough lines), and select a strongest one of the Hough lines L2 that is parallel to L1 (e.g., within a threshold such as 5° of L1). Perspective analysis may be applied in situations where the pipe may run in the direction of the camera, resulting in lines that are not parallel in the actual image data. Probability that the lines L1 and L2 correspond to a lateral pipe may be adjusted using Kalman filter tracking. For example, the Kalman filter tracking may track the suspected lateral pipe from an initial detection point to predict an end position of the pipe. If the predicted end position corresponds to actual detected features in the frame, then the frame may include a lateral pipe.

The color information may indicate a lateral pipe and/or a crossbore. For example, the training image and data classifier module 304 may implement an HSV histogram to identify amounts of selected colors (e.g., colors corresponding to known colors of certain types of utility pipes) in portions of the frame of image data.

The K-means clustering may indicate a lateral pipe and/or a crossbore. For example, a single Gaussian distribution (e.g., on hue) on a histogram may correspond to no crossbore, and a double Gaussian distribution (e.g., on hue) on a histogram may correspond to a crossbore.

The discretized histogram of gradient magnitude may be used for edge detection and are indicative of both a lateral pipe and a crossbore. For example only, the discretized histogram may be calculated after a Gauss Blur and edge detector (e.g., a Canny edge detector) are applied to remove noise. In the histogram, peaks above a threshold indicate relatively strong edges.

After the features are extracted from the frames of the training image data, the training image and data classifier module 304 labels (i.e., classifies, via operator/user input) each of the frames. The labels may include "lateral pipe," "no lateral pipe," "crossbore," and/or "no crossbore," and may include sub-labels such as "approaching lateral pipe," "approaching crossbore," and soil type (e.g., sand, clay, rocky, etc.). For the model adaptation module 300, the labels are applied manually (i.e., by a human operator/user). In other words, the operator views each frame and labels the frame based on visible features in the image.

For each of the extracted features, the model adaptation module 300 assigns a probability that that feature corresponds to a crossbore, no crossbore, a lateral pipe, and/or no lateral pipe based on the labels assigned by the operator. For example, the classifier module 304 assigns a probability that two strong parallel lines indicate a lateral pipe based on how many times the corresponding extracted feature (e.g., two strong parallel lines) was ultimately labeled as a lateral pipe by the operator. Conversely, the classifier module 304 assigns a probability that two strong parallel lines do not correspond to a lateral pipe (i.e., no lateral pipe) based on how many times the corresponding extracted feature (e.g., two strong parallel lines) was ultimately labeled as no lateral pipe by the operator. Accordingly, each of the extracted features is assigned a respective probability. The classified training image data is then stored according to the labels. For example, each frame may be indexed by a frame number (e.g., 1, 2, . . . n) and respective labels in the training and test data storage 308, along with data indicating the probabilities that each feature corresponds to the respective labels.

The test data is stored along with the training image data in the training and test data storage 308. The test data corresponds to fewer test data frames than the training image data. In other words, a larger portion of the image data stored in the training and test data storage 308 corresponds to the training image data than to the test data. The training image data is labeled by the operator as described above. In contrast, the test data is not labeled by the operator. Instead, the test data, which may include image data frames identical to a portion of the training image data, is analyzed according to the model. The results of analyzing the test data (i.e., assigned labels and/or probabilities) are compared to the labeled training image data to determine the accuracy of the model. The model can be adjusted based on the accuracy. For example, the result evaluation module 312 may determine an error rate associated with the evaluation of the test data, and/or an average error rate associated with a plurality of evaluations.

Referring again to FIG. 2, the classifier module 212 analyzes the image data received from the image data storage 208 (i.e., extracts features from the images) and calculates, based on the extracted features and the training image data, probabilities that each frame includes a crossbore, no crossbore, a lateral pipe, or no lateral pipe. For example, a probability that a frame includes a crossbore may include a combination of each of the probabilities that each of the features detected in the frame corresponds to a crossbore. A probability that a frame includes no crossbore may include a combination of each of the probabilities that each of the features detected in the frame corresponds to no crossbore. A probability that a frame includes a lateral pipe may include a combination of each of the probabilities that each of the features detected in the frame corresponds to a lateral pipe. A probability that a frame includes no lateral pipe may include a combination of each of the probabilities that each of the features detected in the frame corresponds to no lateral pipe.

For example only, the probability may be calculated according to various methods, such as a Naïve Bayes Classification. For example, the Naïve Bayes Classification may calculate a probability that a frame includes a lateral pipe based on the probabilities assigned to the parallel lines detection the color information, and the discretized histogram. If the calculated probability is greater than a threshold, then the classifier module 212 assigns a lateral pipe label to the frame. For example only, the threshold may be fixed (e.g., 50%), and/or may be adjustable to be more sensitive (i.e., lowered) or less sensitive (i.e., raised). The classifier module 212 determines whether to assign labels for no lateral pipe, a crossbore, and no crossbore to the frame in a similar manner. In other implementations, the probability may simply be a sum, an average, or any other combination of the probabilities of the respective features.

Further, for some frames, all of the probabilities for assigning labels (e.g., lateral pipe, no lateral pipe, crossbore, and no crossbore) may be less than the respective thresholds. Accordingly, a frame may not qualify for any of the labels. For such a frame, the classifier module 212 may perform a "nearest neighbor" calculation to assign one or more labels. For example, the classifier module 212 may determine, based on the extracted features, which training image data frame most closely resembles the frame. The classifier module 212 labels the frame based on the labels assigned to the closest training image data frame.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system for determining whether a newly installed utility line or a tunnel for installing a utility line bores through an existing utility line, the system comprising:
    a visual inspection system, including
        an inspection camera that captures images from within an interior of at least one of the existing utility line and the tunnel for installing the utility line, and
        a first communication interface that communicates image data corresponding to the images; and
    an image analysis system including
        a second communication interface that receives the image data from the visual inspection system,
        a model adaptation module that modifies a classifier model based on at least one of feedback data and training data, and
        a classifier module that
            (i) implements the classifier model to identify a plurality of features in the image data corresponding to defects, wherein the defects include at least one of a cross-bore and a lateral pipe, wherein the classifier model categorizes each of the plurality of the features, wherein each of the plurality of features is indicative of at least one of the defects, wherein at least one of the plurality of features corresponding to the cross-bore indicates, from within the tunnel for installing the utility line, that the tunnel bores through the existing utility line, and wherein at least one of the plurality of features corresponding to the lateral pipe indicates, from within the existing utility line, that the newly installed utility line passes through the existing utility line, and
            (ii) modifies the image data according to the identified plurality of features.

2. The system of claim 1 wherein the image analysis system is at least one of remotely located from the visual inspection system and integrated within the visual inspection system.

3. The system of claim 1, wherein the image analysis system receives the image data from the visual inspection system via a cloud networking system.

4. The system of claim 3, wherein one or more functions of the image analysis system are implemented using the cloud networking system.

5. The system of claim 1, wherein the classifier model assigns a probability to each of the plurality of features, and wherein each of the probabilities corresponds to a probability that a respective one of the defects is present in the image data.

6. The system of claim 1, wherein modifying the image data according to the identified features includes assigning a label to a frame of the image data that includes one of the identified features.

7. The system of claim 6, wherein the label includes an indication of at least one of a lateral pipe, no lateral pipe, a crossbore, and no crossbore in the frame.

8. The system of claim 1, wherein the training data includes training image data including the plurality of features.

9. The system of claim 8, wherein the model adaptation module modifies the classifier model based on whether the classifier model identifies the plurality of the features in the training image data.

10. The system of claim 1, wherein the plurality of features include at least one of parallel lines, color information, K-means clustering, and gradients.

11. The system of claim 1, wherein the model adaptation module extracts the plurality of features from the training data, labels the image data according to the plurality of features extracted from the training data using the classifier model, stores classified training data corresponding to the labeled image data, compares the classified training data to test data indicative of actual features included in the training data, and updates the classifier model according to the comparison.

12. The system of claim 1, wherein the feedback data corresponds to feedback provided by a user indicative of whether the plurality of features identified by the classifier module are accurate.

13. The system of claim 1, wherein modifying the image data includes indicating a soil type indicated by the plurality of features.

14. The system of claim 1, wherein the classifier model assigns a probability to one of the identified features that at least one of the defects is present in the image data based on a number of times a user indicated that the one of the identified features corresponded to the at least one of the defects.

15. The system of claim 1, wherein identifying the plurality of features in the image data corresponding to defects includes using at least one of parallel lines, K-means clustering, and gradients to identify the at least one of the cross-bore and the lateral pipe.

16. A method for determining whether a newly installed utility line or a tunnel for installing a utility line bores through an existing utility line, the method comprising:
    using an image inspection system, capturing images from within an interior of at least one of the existing utility line and the tunnel for installing the utility line; and
    using an image analysis system,
        receiving image data corresponding to the images;
        modifying a classifier model based on at least one of feedback data and training data;
        using the classifier model to (i) identify a plurality of features in the image data corresponding to defects and (ii) categorize each of the plurality of the features, wherein each of the plurality of features is indicative of at least one of the defects, wherein the defects include at least one of a cross-bore and a lateral pipe, wherein at least one of the features corresponding to the cross-bore indicates, from within the tunnel for installing the utility line, that the tunnel bores through the existing utility line, and wherein at least one of the features corresponding to the lateral pipe indicates, from within the existing utility line, that the newly installed utility line passes through the existing utility line; and modifying the image data according to the identified plurality of features.

17. The method of claim 16 wherein the image analysis system is at least one of remotely located from the visual inspection system and integrated within the visual inspection system.

18. The method of claim 16, wherein the image analysis system receives the image data via a cloud networking system.

19. The method of claim 16, further comprising assigning, using the classifier model, a probability to each of the plurality of features, wherein each of the probabilities corresponds to a probability that a respective one of the defects is present in the image data.

20. The method of claim 16, wherein modifying the image data according to the identified features includes assigning a label to a frame of the image data that includes one of the identified features.

21. The method of claim 20, wherein the label includes an indication of at least one of a lateral pipe, no lateral pipe, a crossbore, and no crossbore in the frame.

22. The method of claim 16, wherein the training data includes training image data including the plurality of features.

23. The method of claim 22, further comprising modifying the classifier model based on whether the classifier model identifies the plurality of the features in the training image data.

24. The method of claim 16, wherein the plurality of features include at least one of parallel lines, color information, K-means clustering, and gradients.

* * * * *